United States Patent
Tsai et al.

(10) Patent No.: US 12,306,520 B2
(45) Date of Patent: May 20, 2025

(54) ROTARY OPTICAL MODULE AND PROJECTION APPARATUS

(71) Applicant: Coretronic Corporation, Hsin-Chu (TW)

(72) Inventors: Te-Ying Tsai, Hsin-Chu (TW); Ming-Feng Hou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 436 days.

(21) Appl. No.: 17/953,337

(22) Filed: Sep. 27, 2022

(65) Prior Publication Data

US 2023/0119101 A1 Apr. 20, 2023

(30) Foreign Application Priority Data

Oct. 15, 2021 (CN) .......................... 202122483323.9

(51) Int. Cl.
*G03B 21/20* (2006.01)
(52) U.S. Cl.
CPC ................ *G03B 21/204* (2013.01)
(58) Field of Classification Search
None
See application file for complete search history.

(56) References Cited

U.S. PATENT DOCUMENTS

| | | | |
|---|---|---|---|
| 6,618,213 B2 | 9/2003 | Inamoto | |
| 7,018,051 B2 | 3/2006 | Bok | |
| 9,470,887 B2 | 10/2016 | Tsai et al. | |
| 2013/0169938 A1 | 7/2013 | Huang et al. | |
| 2021/0250560 A1 | 8/2021 | Tsai et al. | |

FOREIGN PATENT DOCUMENTS

| | | | | |
|---|---|---|---|---|
| CN | 204178109 | | 2/2015 | |
| CN | 106909021 | | 6/2017 | |
| CN | 111505893 | | 8/2020 | |
| CN | 211786360 U | * | 10/2020 | ............ G02B 26/00 |
| IN | 211786360 | | 10/2020 | |
| TW | I297418 | | 6/2008 | |
| TW | I651580 | | 2/2019 | |

* cited by examiner

*Primary Examiner* — Bao-Luan Q Le
(74) *Attorney, Agent, or Firm* — JCIPRNET

(57) ABSTRACT

Provided is a rotary optical module, including a drive device, an optical turntable, a balance ring, at least one counterweight device, and multiple protruding structures. The drive device includes a rotary axis, extending along a first direction. The optical turntable and the balance ring are both sleeved on the rotary axis of the drive device, and the balance ring is located between the drive device and the optical turntable. The balance ring includes an outer retaining wall, located at the edge of the balance ring. The at least one counterweight device is disposed on the balance ring and abuts against the inner side of the outer retaining wall. The protruding structures are radially arranged on the balance ring with the rotary axis as the center, and the height of the protruding structures in the first direction is greater than the height of the outer retaining wall in the first direction.

20 Claims, 9 Drawing Sheets

ROTARY OPTICAL MODULE AND PROJECTION APPARATUS

CROSS-REFERENCE TO RELATED APPLICATION

This application claims the priority benefit of China application serial no. 202122483323.9, filed on Oct. 15, 2021. The entirety of the above-mentioned patent application is hereby incorporated by reference herein and made a part of this specification.

BACKGROUND

Technical Field

The disclosure relates to an optical module and an electronic apparatus, and more particularly to a rotary optical module and a projection apparatus.

Description of Related Art

A projection apparatus is a display apparatus for producing large images and has been continuously improved with the evolution and innovation of technology. The projection apparatus forms a projection image by converting an illumination beam generated by an illumination system to an image beam with a light valve and then projecting the image beam onto a projection target (such as a screen or a wall) through a projection lens.

In addition, for requirements of the projection apparatus in the market such as luminance, color saturation, service life, or being non-toxicity and eco-friendly, the illumination system has evolved all the way from an ultra-high-performance (UHP) lamp to an light-emitting diode (LED), and to the currently most advanced laser diode (LD) light source. However, the cost-effective way to generate red light and green light in the illumination system currently is to emit an excitation beam to a phosphor wheel by a blue laser diode and excite phosphors of the phosphor wheel with the excitation beam to generate yellow light. Next, the required red light or green light is filtered out by a filter element for use.

In the known phosphor wheel, a metal ring is required to be disposed on a turntable on which phosphor powder is disposed, in order to increase the weight of the turntable at a specific side or position, thereby optimizing the centroid of the phosphor wheel. The edge of the metal ring is a protruding structure, which is concentric with the turntable and is configured to avoid dynamic balance counterweight materials from detachment during rotation of the phosphor wheel at high speed. However, this concentric protruding structure does not have good heat dissipation effect on the turntable. Specifically, when rotating inside a cavity, the phosphor wheel drives the air flow field around, and cold air is flung outward by the phosphor wheel after sucked in from the region near a turntable axis. Therefore, the cold air cannot have sufficient disturbance and time for heat exchange with the turntable and the metal ring, which leads to poor heat dissipation efficiency of the turntable.

In addition, if the metal ring and a motor are on different sides, the center of mass is far away from the motor, which is not conducive to dynamic balance control and increases noise of the phosphor wheel. On the other hand, current research results have found that adding a concave-convex structure to a turntable can lower the phosphor temperature by 10% to 20% compared to a plane turntable. However, as energy density of the phosphor region continues to rise, the design of adding a concave-convex structure to a turntable is no longer sufficient.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a rotary optical module and a projection apparatus, which may increase turbulence and enhance heat dissipation effect.

Other objectives and advantages of the disclosure may be further understood from the technical features disclosed herein.

In order to achieve one or a part or all of the above or other objectives, the disclosure provides a rotary optical module, including a drive device, an optical turntable, a balance ring, at least one counterweight device, and multiple protruding structures. The drive device includes a rotary axis extending along a first direction. The optical turntable is sleeved on the rotary axis of the drive device. The balance ring is sleeved on the rotary axis of the drive device, and the balance ring is located between the body of the drive device and the optical turntable. The balance ring includes an outer retaining wall, located at the edge of the balance ring. The at least one counterweight device is disposed on the balance ring and abuts against the inner side of the outer retaining wall. The protruding structures are radially arranged on the balance ring with the rotary axis as the center, and the height of the protruding structures in the first direction is greater than the height of the outer retaining wall in the first direction.

In order to achieve one or a part or all of the above or other objectives, the disclosure provides a projection apparatus including the rotary optical module. The projection apparatus includes an illumination system, at least one light valve, and a projection lens. The illumination system is configured to provide illumination beam, the illumination system includes the rotary optical module. The at least one light valve is disposed in a transmission path of the illumination beam and is adapted for converting the illumination beam to an image beam. The projection lens is disposed in a transmission path of the image beam and is adapted for projecting the image beam out of the projection apparatus, wherein a height of the plurality of protruding structures in the first direction is greater than a height of the outer retaining wall in the first direction.

Based on the above, the embodiments of the disclosure have at least one of the following effects. In the rotary optical module and the projection apparatus of the disclosure, the rotary optical module includes multiple protruding structures radially arranged on the balance ring with the rotary axis of the drive device as the center. The height of the protruding structures in the extension direction of the rotary axis is greater than the height of the outer retaining wall in the extension direction of the rotary axis. Therefore, when the heat of the optical turntable is transferred to the protruding structures on the balance ring, the surfaces of these protruding structures may effectively increase heat dissipation area for heat dissipation. In addition, when the balance ring and the optical turntable are synchronously rotating, these protruding structures produce turbulence flowing through the optical turntable, and this turbulence may effectively dissipate the heat of the optical turntable. In this way, compared to a traditional rotary optical module, the heat dissipation effect of the rotary optical module may be improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
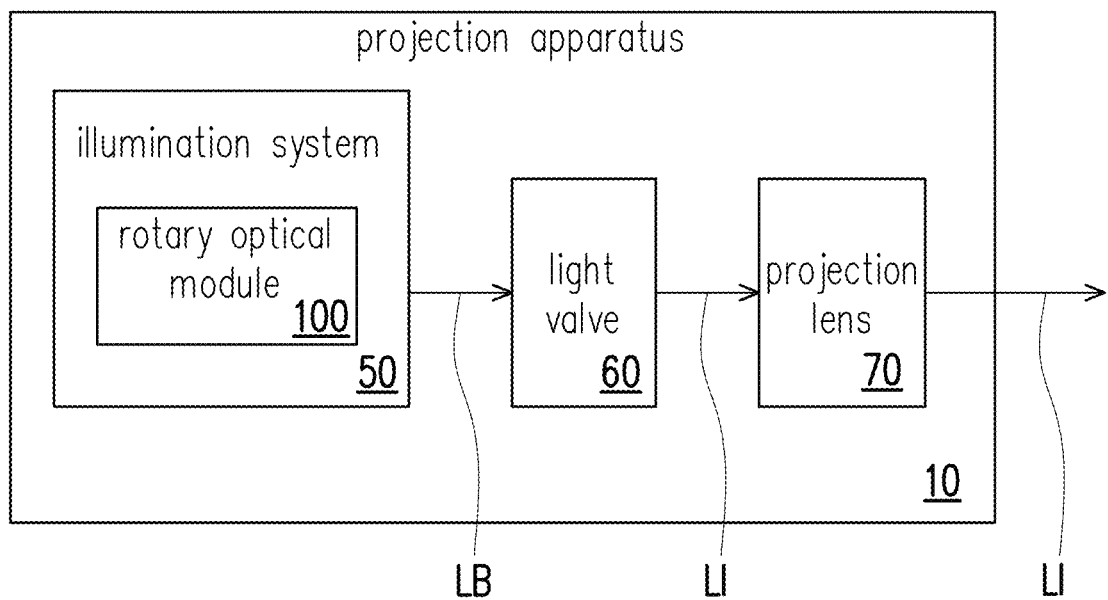
FIG. 1 is a schematic view of a projection apparatus according to an embodiment of the disclosure.

FIG. 1 is a schematic view of a projection apparatus according to an embodiment of the disclosure. With reference to FIG. 1, this embodiment provides a projection apparatus 10, including an illumination system 50, at least one light valve 60, and a projection lens 70. The illumination system 50 is for providing an illumination beam LB. The at least one light valve 60 is disposed in the transmission path of an illumination beam LB for converting the illumination beam LB to an image beam LI. The projection lens 70 is disposed in the transmission path of the image beam LI for projecting the image beam LI out of the projection apparatus 10 onto a projection target (not shown), such as a screen or a wall.

For example, the illumination system 50 includes, for example, multiple light-emitting devices, a wavelength conversion device, a light homogenizing device, a filter device, and multiple light splitting and combining devices for providing light of different wavelengths as a source of image light. However, the disclosure does not limit the type or form of the illumination system 50 in the projection apparatus 10, and the detailed structure and implementation thereof can be sufficiently taught, suggested, and implemented by the following paragraphs and the general knowledge in the art.

The light valve 60 is, for example, a reflective optical modulator such as a liquid crystal on silicon panel (LCoS panel) or a digital micro-mirror device (DMD). In some embodiments, the light valve 60 may also be a transmissive light modulator such as a transparent liquid crystal panel, an electro-optical modulator, a magneto-optical modulator, or an acousto-optic modulator (AOM), but the disclosure does not limit the type or form of the light valve 60. Regarding the method by which the light valve 60 converts the illumination beam LB to the image beam LI, the detailed steps and implementation thereof can be sufficiently taught, suggested, and implemented by the general knowledge in the art, and therefore will not be described herein. In this embodiment, the amount of the light valve 60 is one, such as one single DMD used in the projection apparatus 10; however, in other embodiments, the amount may be plural, and the disclosure is not limited thereto.

The projection lens 70 includes, for example, one or a combination of multiple optical lenses having a diopter, such as various combinations of non-planar lenses including biconcave lenses, biconvex lenses, concave-convex lenses, convex-concave lenses, plane-convex lenses, and plane-concave lenses. In an embodiment, the projection lens 70 may further include a planar optical lens to project the image beam LI from the light valve 60 to the projection target in a reflective manner. The disclosure does not limit the type or form of the projection lens 70.

The illumination system 50 includes a rotary optical module 100, disposed in the light path in the illumination system 50 to excite the passing light or increase uniformity. For example, the rotary optical module 100 is, for example but not limited to, a rotary wavelength conversion apparatus or a rotary diffusion apparatus.

Figure 2:
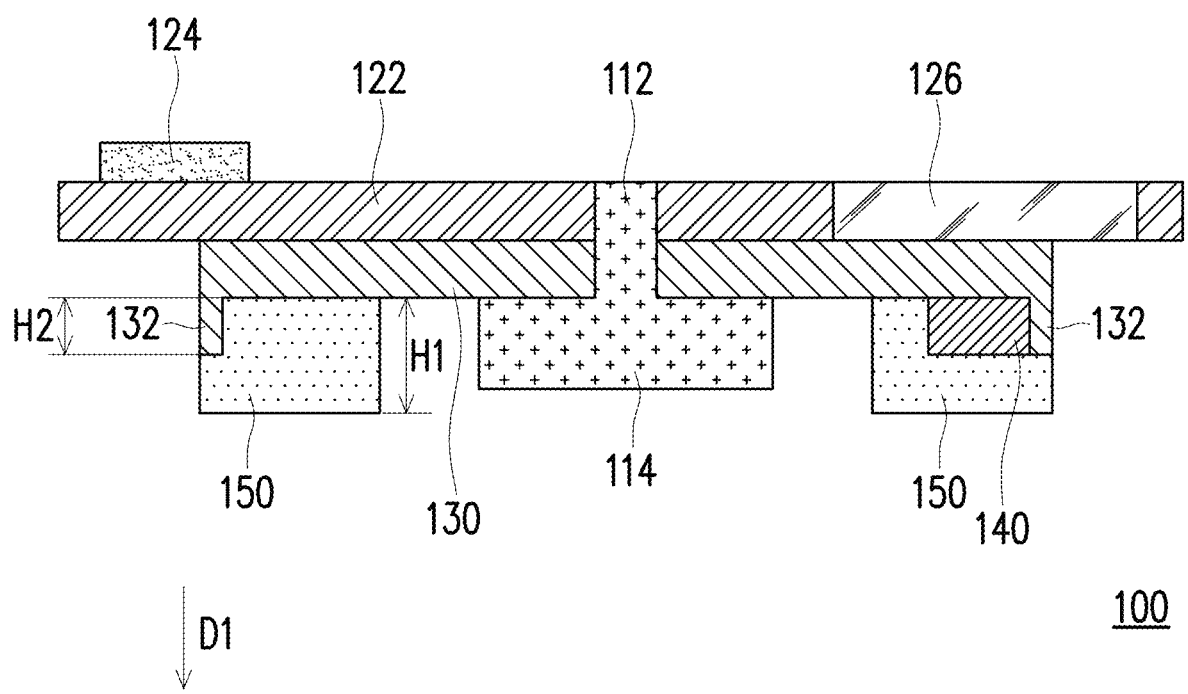
FIG. 2 is a schematic cross-sectional view of a rotary optical module according to an embodiment of the disclosure.
Figure 3:
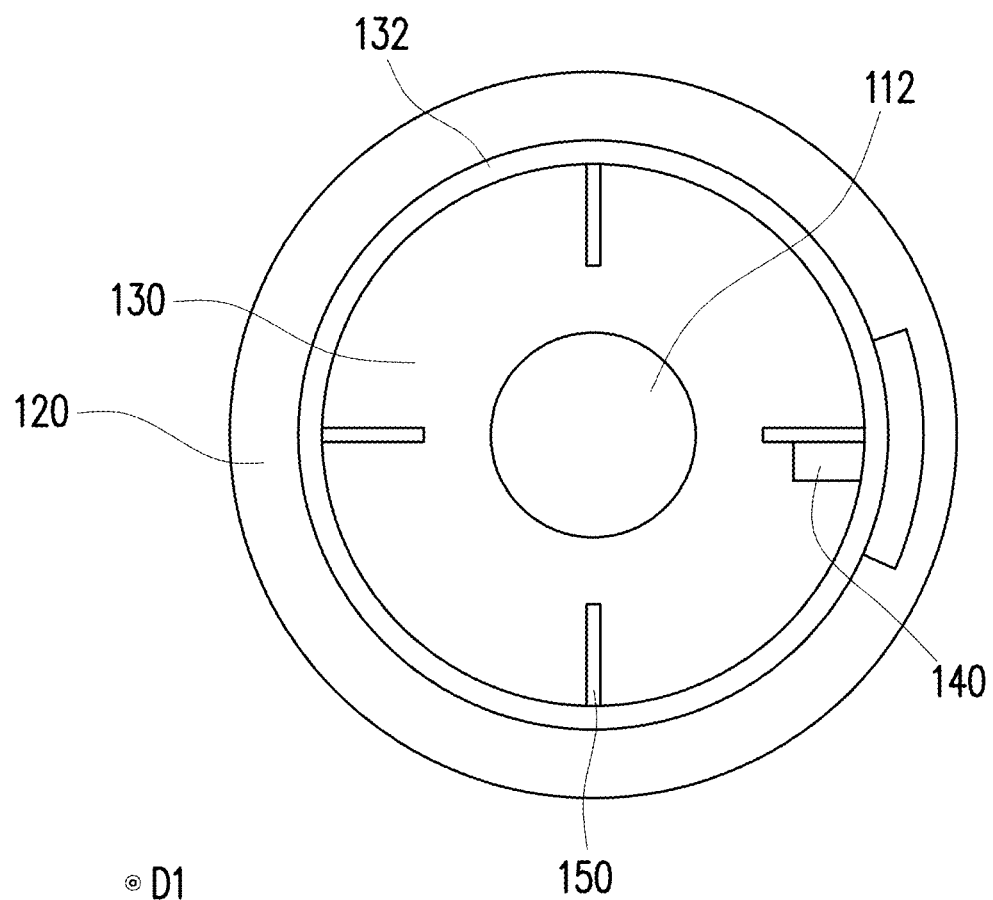
FIG. 3 is a schematic top view of the rotary optical module of FIG. 2.

FIG. 2 is a schematic cross-sectional view of a rotary optical module according to an embodiment of the disclosure. FIG. 3 is a schematic top view of the rotary optical module of FIG. 2. With reference to FIG. 2 and FIG. 3, the rotary optical module 100 includes a drive device 110, an optical turntable 120, a balance ring 130, at least one counterweight device 140, and multiple protruding structures 150. The outer diameter of the optical turntable 120 is greater than the outer diameter of the balance ring 140.

The drive device 110 includes a rotary axis 112 extending along a first direction D1. Specifically, the drive device 110 further includes a body 114 for driving the rotary axis 112 to rotate, and the rotary axis 112 is for rotating members in contact therewith. The drive device 110 is, for example, a motor, but the disclosure does not limit the type of the motor.

The optical turntable 120 is sleeved on the rotary axis 112 of the drive device 110. The optical turntable 120 is, for example, a wavelength conversion wheel, or may be a color filter wheel or a diffusion wheel, but the disclosure is not limited thereto. Specifically, the optical turntable 120 includes a turntable 122, an optical material 124, and a light transmissive member 126. The axis of the turntable 122 has an opening for allowing the drive device 110 to penetrate by the rotary axis 112 extending from the body 114. The turntable 122 is for fixing (for example, by pasting) the optical material 124 or embedding other optical devices (such as the light transmissive device 126). The material of the turntable 122 is, for example but not limited to, a metal, a high temperature resistant material, a material with a high thermal conductivity coefficient, a material with good adhesive properties, or a combination of at least two of the above materials, such as aluminum.

The optical material 124 is, for example, a wavelength conversion material for converting the wavelength of a beam, a reflection material for reflecting a beam, or a diffusion material for allowing a beam to pass through to obtain a beam of a required color or to improve the uniformity. In this embodiment, the optical material 124 is a wavelength conversion material, such as a ceramic phosphor sheet, a glass ceramic phosphor sheet, an organic adhesive phosphor sheet, or an inorganic adhesive phosphor sheet, but the disclosure is not limited thereto. Specifically, the optical material 124 is disposed in a ring shape or a partial ring shape on the turntable 122. The light transmissive member 126 is, for example but not limited to, light transmissive glass or other types of light transmissive devices.

The balance ring 130 is sleeved on the rotary axis 112 of the drive device 110, and the balance ring 130 is located between the body 114 of the drive device 110 and the optical turntable 120. The balance ring 130 includes an outer retaining wall 132, located at the edge of the balance ring 130. Specifically, in this embodiment, the outer retaining wall 132 extends away from the balance ring 130 along the first direction D1 from the balance ring 130. The material of the balance ring 130 is, for example, a metal for increasing the weight of the rotary optical module 100 or carrying other objects disposed to adjust the centroid position of the rotary optical module 100. For example, in this embodiment, the balance ring 130 is for carrying the counterweight device 140.

The counterweight device 140 is disposed on the balance ring 130 and abuts against the inner side of the outer retaining wall 132. The counterweight device 140 is for adjusting the common centroid (center of mass) position of the counterweight device 140 and the balance ring 130 to improve the balance of the rotary optical module 100 during rotation.

Figure 4:
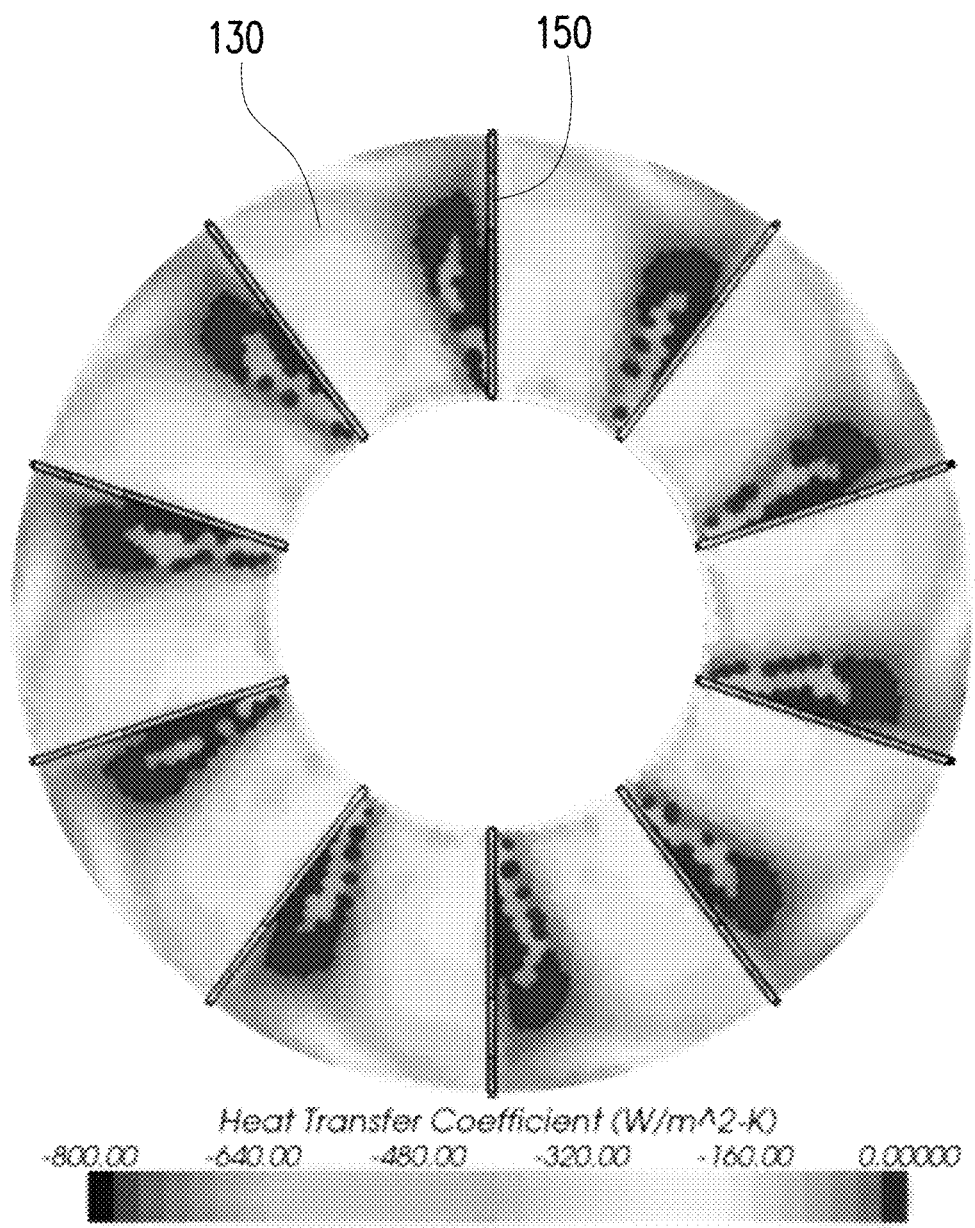
FIG. 4 is a schematic heat transfer coefficient view of the rotary optical module in FIG. 2 when viewed from above.

FIG. 4 is a schematic heat transfer coefficient view of the rotary optical module in FIG. 2 when viewed from above. With reference to FIG. 2 to FIG. 4 together, multiple protruding structures 150 are radially arranged on the balance ring 130 with the rotary axis 112 as the center, and a height H1 of the protruding structures 150 in the first direction D1 is greater than a height H2 of the outer retaining wall 132 in the first direction D1, as shown in FIG. 2. In detail, in this embodiment, the protruding structures 150 extend from inside the edge of the balance ring 130 to the edge of the balance ring 130, and these protruding structures 150 have two opposite planes or two opposite curved surfaces extending along the first direction D1. When the heat of the optical turntable 120 is transferred to the protruding structures 150 on the balance ring 130, the surfaces of these protruding structures 150 may effectively increase heat dissipation area for heat dissipation. In addition, when the balance ring 130 and the optical turntable 120 are synchronously rotating, these protruding structures 150 produce turbulence flowing through the optical turntable 120, and this turbulence may effectively dissipate the heat of the optical turntable 120, as schematically simulated and shown in FIG. 4. According to the simulation results, the heat transfer coefficient at the edge of the protruding structure 150 is much increased than that without the protruding structure 150. In this way, the heat dissipation effect of the rotary optical module 100 may be improved. In the simulation, compared to a traditional rotary optical module, this embodiment may increase the heat dissipation efficiency by at least 12.6%.

In different embodiments, multiple protruding structures 150 and the balance ring 130 may be manufactured to be integrally formed for improving stability and heat dissipation effect during rotation. In addition, in this embodiment, the counterweight device 140 further abuts against at least one of the protruding structures 150. In this way, the stability of the counterweight device 140 during rotation may be further improved.

Figure 5:
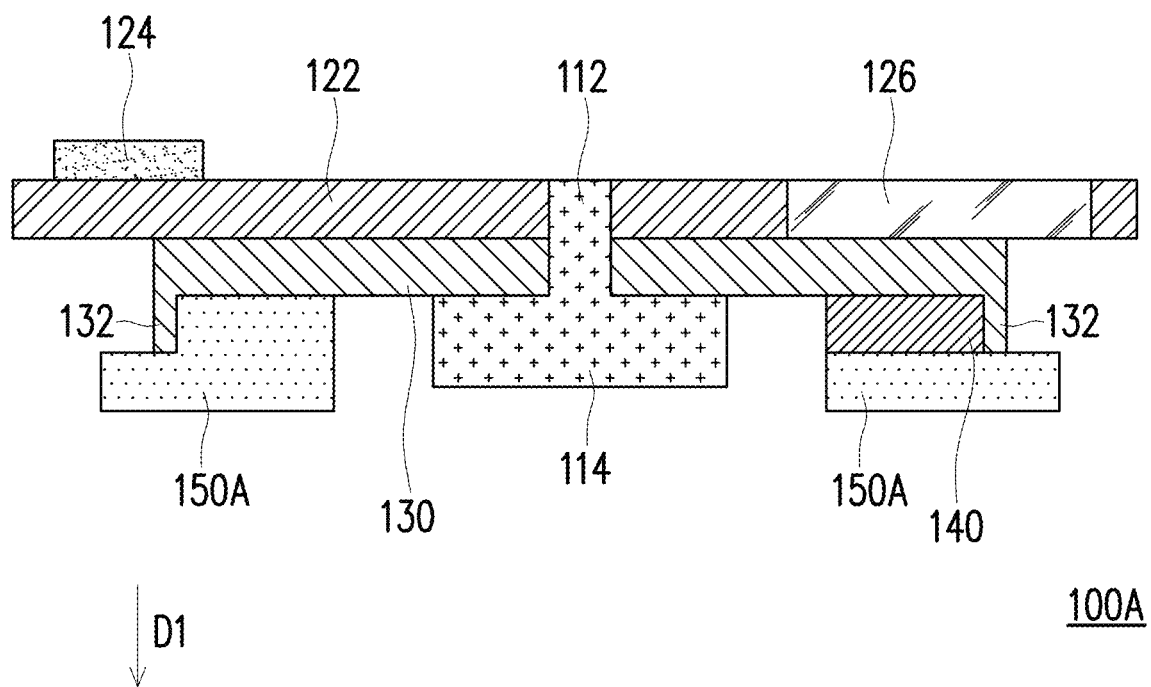
FIG. 5 is a schematic cross-sectional view of a rotary optical module according to another embodiment of the disclosure.

FIG. 5 is a schematic cross-sectional view of a rotary optical module according to another embodiment of the disclosure. With reference to FIG. 5, a rotary optical module 100A of this embodiment is similar to the rotary optical module 100 shown in FIG. 2. The difference between the two lies in that multiple protruding structures 150A in this embodiment further extend beyond the edge of the balance ring 130. Specifically, the extension line of the protruding structures 150A in the radial direction intersects with the outer retaining wall 132 of the balance ring 130, such that the protruding structures 150A may extend beyond the outer retaining wall 132 in the radial direction to protrude outside the balance ring 130. Therefore, heat dissipation area may be further increased to improve heat dissipation effect. However, the protruding length of the protruding structures 150A may be adjusted according to requirements, and the disclosure is not limited thereto.

Figure 6:
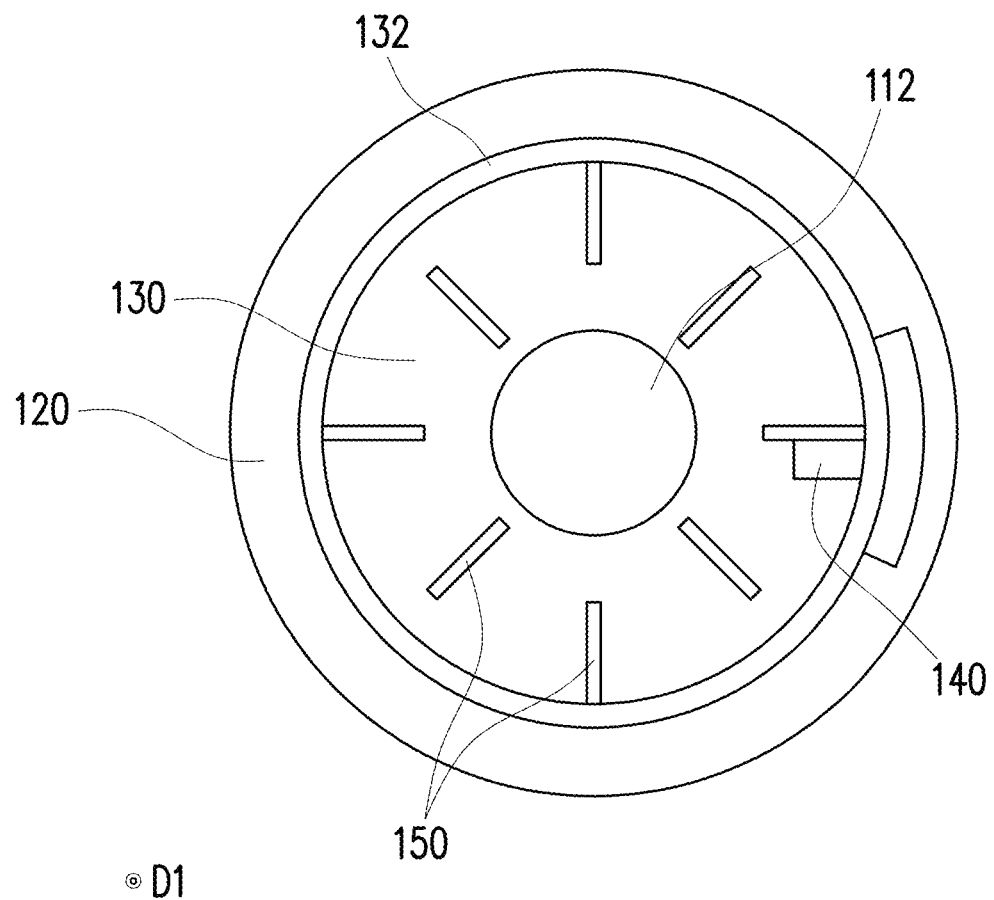
FIG. 6 is a schematic top view of a rotary optical module according to another embodiment of the disclosure.
Figure 7:
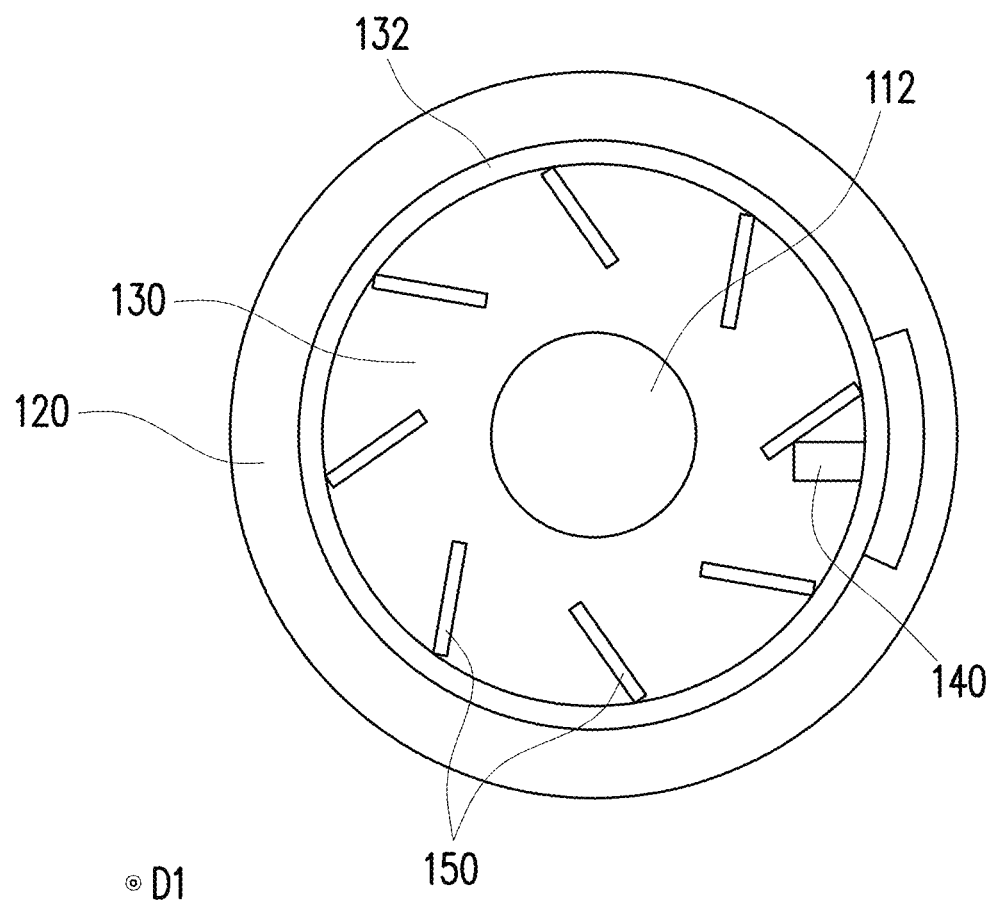
FIG. 7 is a schematic top view of a rotary optical module according to another embodiment of the disclosure.
Figure 8:
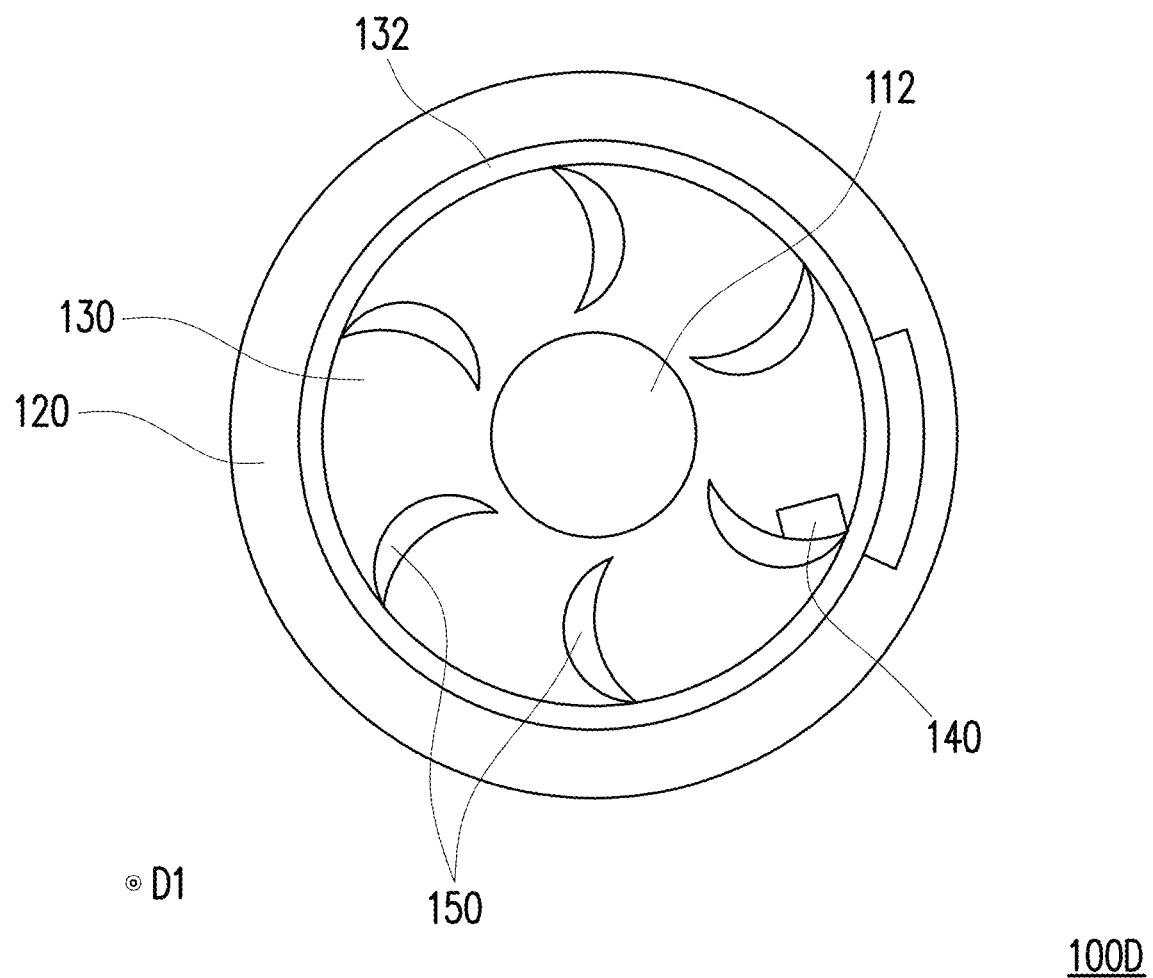
FIG. 8 is a schematic top view of a rotary optical module according to another embodiment of the disclosure.

FIG. 6 is a schematic top view of a rotary optical module according to another embodiment of the disclosure. FIG. 7 is a schematic top view of a rotary optical module according to another embodiment of the disclosure. FIG. 8 is a schematic top view of a rotary optical module according to another embodiment of the disclosure. With reference to FIG. 6 first, a rotary optical module 100B of this embodiment is similar to the rotary optical module 100 shown in FIG. 2, and the difference lies in that the protruding structures 150 in this embodiment are arranged in an internal and external staggered layout. Therefore, the surrounding air disturbance may be further enhanced to improve heat dissipation effect. With reference to FIG. 7, a rotary optical module 100C of this embodiment is similar to the rotary optical module 100 shown in FIG. 2, and the difference lies in that the protruding structures 150 in this embodiment are not perpendicular to the outer retaining wall 132 of the balance ring 130. Therefore, the surrounding air disturbance may also be further enhanced to improve heat dissipation effect. With reference to FIG. 8, a rotary optical module 100D of this embodiment is similar to the rotary optical module 100 shown in FIG. 2, and the difference lies in that the protruding structures 150 in this embodiment have curved surfaces. Therefore, the surrounding air disturbance may also be further enhanced to improve heat dissipation effect.

Figure 9:
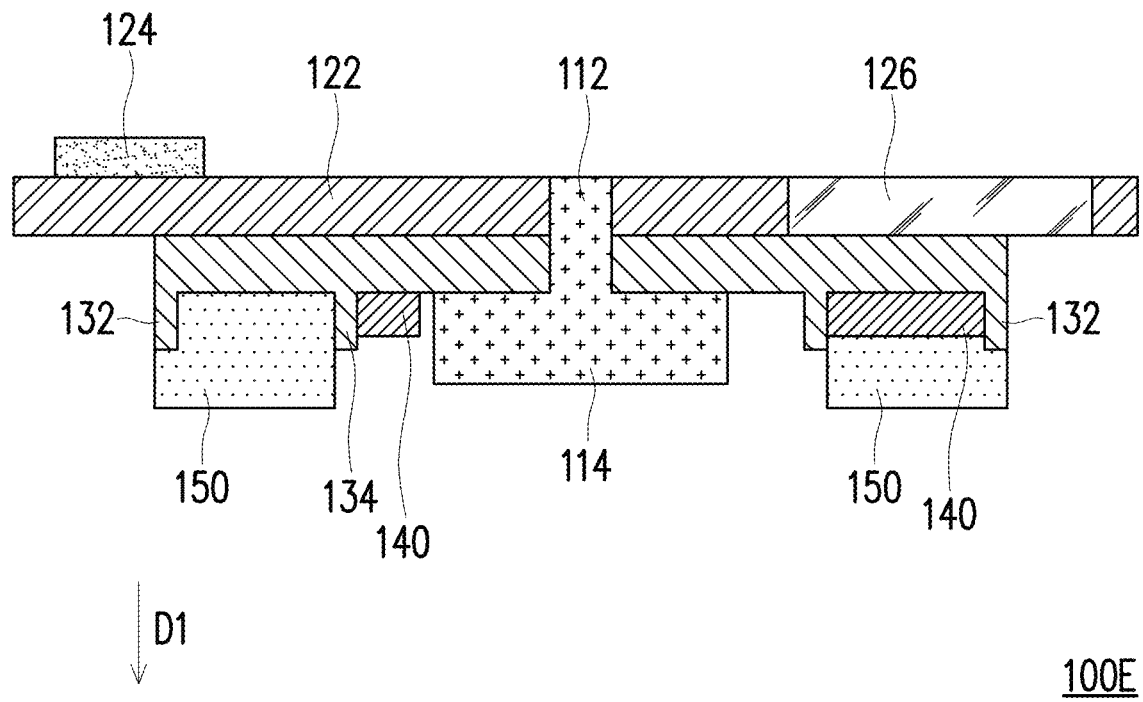
FIG. 9 is a schematic cross-sectional view of a rotary optical module according to another embodiment of the disclosure.

FIG. 9 is a schematic cross-sectional view of a rotary optical module according to another embodiment of the disclosure. With reference to FIG. 9, a rotary optical module 100E of this embodiment is similar to the rotary optical module 100 shown in FIG. 2, and the difference lies in that a balance ring 130A in this embodiment further includes an inner retaining wall 134 located between the outer retaining wall 132 and the rotary axis 112. The amount of the counterweight device 140 is two, and the two counterweight devices 140, as shown in FIG. 9, respectively abut against the inner side of the outer retaining wall 132 and the inner side of the inner retaining wall 134. The protruding structures 150 are disposed between the inner retaining wall 134 and the outer retaining wall 132. In this way, the stability of the counterweight device 140 may be further improved, and the convenience and precision of adjusting the centroid position of the rotary optical module 100E may be improved with multiple counterweight devices 140. In addition, since the area of the protruding structures 150 and the balance ring 130A is increased, heat dissipation effect may be further improved. However, the disclosure does not limit the amount and position of the inner retaining wall 134 and the counterweight device 140.

In summary, in the rotary optical module and the projection apparatus of the disclosure, the rotary optical module includes multiple protruding structures radially arranged on the balance ring with the rotary axis of the drive device as the center. The height of the protruding structures in the extension direction of the rotary axis is greater than the height of the outer retaining wall in the extension direction of the rotary axis. Therefore, when the heat of the optical turntable is transferred to the protruding structures on the balance ring, the surfaces of these protruding structures may effectively increase heat dissipation area for heat dissipation. In addition, when the balance ring and the optical turntable are synchronously rotating, these protruding structures produce turbulence flowing through the optical turntable, and this turbulence may effectively dissipate the heat of the optical turntable. In this way, compared to the traditional rotary optical module, the heat dissipation effect of the rotary optical module may be improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no device and component in the present disclosure is intended to be dedicated to the public regardless of whether the device or component is explicitly recited in the following claims.

What is claimed is:

1. A rotary optical module, comprising a drive device, an optical turntable, a balance ring, at least one counterweight device, and a plurality of protruding structures, wherein:
   the drive device comprises a rotary axis extending along a first direction;
   the optical turntable is sleeved on the rotary axis of the drive device;
   the balance ring is sleeved on the rotary axis of the drive device, the balance ring is located between the drive device and the optical turntable, the balance ring comprises an outer retaining wall, and the outer retaining wall is located at an edge of the balance ring;
   the at least one counterweight device is disposed on the balance ring, and the at least one counterweight device abuts against an inner side of the outer retaining wall; and
   the plurality of protruding structures are radially arranged on the balance ring with the rotary axis as a center, wherein a height of the plurality of protruding structures in the first direction is greater than a height of the outer retaining wall in the first direction.

2. The rotary optical module according to claim 1, wherein the plurality of protruding structures extend from a position inside the edge of the balance ring to the edge of the balance ring.

3. The rotary optical module according to claim 2, wherein the plurality of protruding structures further extend beyond the edge of the balance ring.

4. The rotary optical module according to claim 1, wherein the plurality of protruding structures and the balance ring are integrally formed.

5. The rotary optical module according to claim 1, wherein the plurality of protruding structures have two opposite planes or two opposite curved surfaces, extending along the first direction.

6. The rotary optical module according to claim 1, wherein the outer retaining wall extends away from the balance ring along the first direction from the balance ring.

7. The rotary optical module according to claim 1, wherein the at least one counterweight device further abuts against at least one of the plurality of protruding structures.

8. The rotary optical module according to claim 1, wherein the balance ring further includes at least one inner retaining wall, the at least one inner retaining wall is located between the outer retaining wall and the rotary axis, an amount of the at least one counterweight device is plural, and a plurality of the at least one counterweight device respectively abut against the inner side of the outer retaining wall and an inner side of the at least one inner retaining wall.

9. The rotary optical module according to claim 8, wherein the plurality of protruding structures are disposed between the at least one inner retaining wall and the outer retaining wall.

10. The rotary optical module according to claim 1, wherein the optical turntable is a wavelength conversion wheel, a color filter wheel, or a diffusion wheel.

11. A projection apparatus, comprising an illumination system, at least one light valve, and a projection lens, wherein:
the illumination system is for providing illumination beam, the illumination system comprises a rotary optical module, and the rotary optical module comprises a drive device, an optical turntable, a balance ring, at least one counterweight device, and a plurality of protruding structures, wherein:
the drive device comprises a rotary axis, extending along a first direction;
the optical turntable is sleeved on the rotary axis of the drive device;
the balance ring is sleeved on the rotary axis of the drive device, the balance ring is located between the drive device and the optical turntable, the balance ring comprises an outer retaining wall, and the outer retaining wall is located at an edge of the balance ring;
the at least one counterweight device is disposed on the balance ring, and the at least one counterweight device abuts against an inner side of the outer retaining wall; and
the plurality of protruding structures are radially arranged on the balance ring with the rotary axis as a center;
the at least one light valve is disposed in a transmission path of the illumination beam and is adapted for converting the illumination beam to an image beam; and
the projection lens is disposed in a transmission path of the image beam and is adapted for projecting the image beam out of the projection apparatus, wherein a height of the plurality of protruding structures in the first direction is greater than a height of the outer retaining wall in the first direction.

12. The projection apparatus according to claim 11, wherein the plurality of protruding structures extend from a position inside the edge of the balance ring to the edge of the balance ring.

13. The projection apparatus according to claim 12, wherein the plurality of protruding structures further extend beyond the edge of the balance ring.

14. The projection apparatus according to claim 11, wherein the plurality of protruding structures and the balance ring are integrally formed.

15. The projection apparatus according to claim 11, wherein the plurality of protruding structures have two opposite planes or two opposite curved surfaces, extending along the first direction.

16. The projection apparatus according to claim 11, wherein the outer retaining wall extends away from the balance ring along the first direction from the balance ring.

17. The projection apparatus according to claim 11, wherein the at least one counterweight device further abuts against at least one of the plurality of protruding structures.

18. The projection apparatus according to claim 11, wherein the balance ring further includes at least one inner retaining wall, the at least one inner retaining wall is located between the outer retaining wall and the rotary axis, an amount of the at least one counterweight device is plural, and a plurality of the at least one counterweight device respectively abut against the inner side of the outer retaining wall and an inner side of the at least one inner retaining wall.

19. The projection apparatus according to claim 18, wherein the plurality of protruding structures are disposed between the at least one inner retaining wall and the outer retaining wall.

20. The projection apparatus according to claim 11, wherein the optical turntable is a wavelength conversion wheel, a color filter wheel, or a diffusion wheel.

* * * * *